US012765711B2

(12) United States Patent
Morin et al.

(10) Patent No.: US 12,765,711 B2
(45) Date of Patent: Oct. 20, 2026

(54) MILK FROTHING DEVICE WITH AN OPTIMIZED HOLDING SYSTEM

(71) Applicant: SEB S.A., Ecully (FR)

(72) Inventors: Gilles Morin, Ecully Cedex (FR); Quentin Dos Santos, Ecully Cedex (FR)

(73) Assignee: SEB S.A., Ecully (FR)

( * ) Notice: Subject to any disclaimer, the term of this patent is extended or adjusted under 35 U.S.C. 154(b) by 760 days.

(21) Appl. No.: 18/209,865

(22) Filed: Jun. 14, 2023

(65) Prior Publication Data

US 2023/0397757 A1 Dec. 14, 2023

(30) Foreign Application Priority Data

Jun. 14, 2022 (FR) ....................................... 2205746

(51) Int. Cl.
*A47J 31/44* (2006.01)

(52) U.S. Cl.
CPC ....... *A47J 31/4489* (2013.01); *A47J 31/4496* (2013.01)

(58) Field of Classification Search
CPC ................ A47J 31/4489; A47J 31/4496; A47J 31/4407; A47J 31/4485
See application file for complete search history.

(56) References Cited

U.S. PATENT DOCUMENTS

2013/0233898 A1* 9/2013 Resnikoff .......... B65D 43/0202 222/568
2015/0196160 A1* 7/2015 De'Longhi ......... A47J 31/4485 99/294
2020/0260904 A1* 8/2020 Castelli .................. B65D 47/30

FOREIGN PATENT DOCUMENTS

EP 3720323 B1 3/2022
WO WO-2005063093 A1 * 7/2005 .......... A47J 31/4485

* cited by examiner

*Primary Examiner* — Edward F Landrum
*Assistant Examiner* — Gargi Mansingh
(74) *Attorney, Agent, or Firm* — Lerner David LLP

(57) ABSTRACT

The milk frothing device includes a mixing part comprising a mixing chamber, a hot water/vapor inlet orifice and a main flow conduit connecting the hot water/vapor inlet orifice to the mixing chamber; a closure part movable relative to the mixing part between a closed position in which the closure part closes the mixing chamber and the main flow conduit and an open position in which the mixing chamber and the main flow conduit are open; a milk supply conduit; a seal extending around the mixing chamber and the main flow conduit and a holding system configured to hold the closure part in the closed position.

16 Claims, 9 Drawing Sheets

MILK FROTHING DEVICE WITH AN OPTIMIZED HOLDING SYSTEM

CROSS-REFERENCE TO RELATED APPLICATIONS

The present application claims priority from French Application No. 22/05746 filed Jun. 14, 2022, the disclosure of which is hereby incorporated herein by reference.

TECHNICAL FIELD

The present invention concerns the field of automatic coffee machines, and more particularly the field of milk frothing devices intended to cooperate with automatic coffee machines.

STATE OF THE ART

The document WO2005/063093 discloses a milk frothing device including:

- a mixing part comprising a mixing chamber provided with an outlet orifice, a vapor inlet orifice, a main flow conduit connecting the vapor inlet orifice to the mixing chamber, a milk supply conduit connected to the main flow conduit and an air supply conduit connected to the main flow conduit,
- a closure part movable relative to the mixing part between a closed position in which the closure part closes the mixing chamber and the main flow conduit and an open position in which the mixing chamber and the main flow conduit are open and accessible for cleaning,
- a seal arranged at a junction area between the mixing part and the closure part and extending around the mixing chamber and the main flow conduit, and
- a holding system configured to hold the closure part in the closed position.

The main flow conduit is more particularly configured so that a vapor flow in the main flow conduit from the vapor inlet orifice and up to the mixing chamber generates a vacuum in the milk supply conduit and a vacuum in the air supply conduit and leads to a suction of milk and air into the main flow conduit.

The particular configuration of the milk frothing device described in the document WO2005/063093, and more particularly of the mixing part and the closure part, allows easy cleaning of the milk frothing device.

However, the assembly of the mixing part and the closure part of the milk frothing device described in the document WO2005/063093 requires the insertion of a projecting fastening member, provided on a rear portion of the closure part, in a fastening groove provided on the mixing part, a pivoting of a front portion of the closure part towards the mixing part and finally the displacement of a locking member, provided on the front portion of the closure part, in a locking position. However, such kinetics of assembly of the mixing and closure parts induce heterogeneous deformations of the seal which are on the one hand likely to harm the integrity of the seal and therefore to induce, over time, fluid leaks at the junction area, and on the other hand to alter the geometry of the mixing chamber and the main flow conduit and therefore to prevent obtaining a milk froth having the desired consistency.

SUMMARY OF THE INVENTION

The present invention aims at overcoming all or part of these drawbacks.

The technical problem underlying the invention consists in particular in providing a milk frothing device which can be easily dismantled and cleaned and which has a reliable and sealed structure, while guaranteeing obtaining a milk froth having a suitable consistency.

To this end, the present invention concerns a milk frothing device intended to cooperate with an automatic coffee machine, the milk frothing device including:

- a mixing part comprising a mixing chamber provided with an outlet orifice, a hot water/vapor inlet orifice and a main flow conduit connecting the hot water/vapor inlet orifice to the mixing chamber,
- a closure part movable relative to the mixing part between a closed position in which the closure part closes the mixing chamber and the main flow conduit and an open position in which the mixing chamber and the main flow conduit are open and accessible for cleaning,
- a milk supply conduit connected to the main flow conduit,
- a seal arranged at a junction area between the mixing part and the closure part and extending around the mixing chamber and the main flow conduit, and
- a holding system configured to hold the closure part in the closed position.

The closure part is configured to occupy an intermediate position located between the closed position and the open position and in which the closure part is located opposite the mixing chamber and the main flow conduit and is spaced apart from the mixing part, and the holding system is configured to confer on the closure part only one translational degree of freedom in a direction of translation when the closure part is displaced between the intermediate position and the closed position, the holding system being further configured to ensure a compression of the seal when the closure part is in the closed position.

Such a configuration of the holding system allows in particular avoiding a rotation or a pivoting of the closure part relative to the mixing part during the displacement of the closure part from the intermediate position to the closed position, and therefore ensuring an axial and uniform compression of the seal when the closure part occupies the closed position. Thus, the holding system according to the present invention allows preserving the integrity of the seal, and limiting the risks of fluid leakage at the junction area.

In addition, such a configuration of the holding system allows avoiding a possible inclination of the closure part with respect to the mixing part when the closure part is in the closed position, and therefore guaranteeing the geometry of the mixing chamber and the main flow conduit. As a result, the holding system according to the present invention allows also guaranteeing the intake of a predetermined amount of milk into the mixing chamber, and therefore obtaining a milk froth having a suitable consistency.

The milk frothing device may furthermore have one or several of the following features, taken alone or in combination.

According to one embodiment of the invention, the holding system is configured to press the closure part against the mixing part when the closure part is in the closed position, so as to compress the seal, and more particularly a sealing lip of the seal.

According to one embodiment of the invention, the holding system includes a first guide member and a second guide member secured respectively to the mixing part and the closure part and configured to be slidably mounted one inside the other, the first and second guide members being configured to guide the closure part in translation relative to the mixing part and in the direction of translation when the closure part is displaced between the intermediate position and the closed position. Such a configuration of the holding system allows ensuring a translational guidance of the closure part while maintaining a simple structure holding system.

According to one embodiment of the invention, one of the first and second guide members is a recessed guide member, and the other of the first and second guide members is a projecting guide member.

According to one embodiment of the invention, the projecting guide member projects downwards from a lower face of the closure part.

According to one embodiment of the invention, the holding system includes a locking part, such as a locking ring, movably mounted between a release position in which the locking part enables a displacement of the closure part towards the open position and a locking position in which the locking part prevents a displacement of the closure part towards the open position. Such a configuration of the holding system allows a user to be able to easily immobilize the closure part in the closed position.

According to one embodiment of the invention, the holding system is configured to displace the closure part from the intermediate position to the closed position and towards the mixing part in the direction of translation, and therefore to move the mixing part and the closure part closer to each other, when the locking part is displaced from the release position to the locking position.

According to one embodiment of the invention, the locking part is annular and is movable in rotation relative to the closure part about an axis of rotation and between the release position and the locking position, the axis of rotation being configured to be substantially parallel to the direction of translation when the closure part occupies the intermediate position. Such a configuration of the holding system allows a user to be able to easily immobilize the closure part in the closed position by a simple rotation of the locking part.

According to one embodiment of the invention, the locking part includes at least one fastening member, such as a fastening ramp, configured to cooperate with at least one fastening element, such as a fastening lug, configured to be secured in rotation to the mixing part, the at least one fastening member being configured to cooperate with the at least one fastening element during a rotation of the locking part from the release position to the locking position so as to displace the locking part in the direction of translation and in the direction of the mixing part, the locking part being configured to displace the closure part towards the mixing part and in the direction of translation during a rotation of the locking part from the release position to the locking position.

According to one embodiment of the invention, the locking part includes a bearing face which extends transversely to the direction of translation, said bearing face being configured to displace the closure part towards the mixing part and in the direction of translation during a rotation of the locking part from the release position to the locking position. Such a configuration of the locking part allows ensuring a uniform compression of the seal.

According to one embodiment of the invention, the bearing face is configured to slide on the closure part during a rotation of the locking part from the release position to the locking position.

According to one embodiment of the invention, the locking part and the closure part form a subset. These arrangements ensure easy handling of the closure part and easy assembly of the closure part on the mixing part.

According to one embodiment of the invention, the locking part is captively mounted on the closure part.

According to one embodiment of the invention, the junction area is planar, and the direction of translation is substantially perpendicular to the junction area.

Such a configuration of the milk frothing device according to the present invention allows easy assembly of the milk frothing device, while ensuring optimal compression of the seal.

According to one embodiment of the invention, the milk frothing device includes an angular stroke limiting device configured to limit an angular stroke of the locking part relative to the closure part. These arrangements allow a user to be able to easily displace the locking part between the release position and the locking position.

According to one embodiment of the invention, the angular stroke limiting device includes a first end stop configured to prevent a rotation of the locking part, in a first direction of rotation, beyond the release position, and a second end stop configured to prevent a rotation of the locking part, in a second direction of rotation, beyond the locking position.

According to one embodiment of the invention, the milk frothing device includes an air supply conduit connected to the main flow conduit.

According to one embodiment of the invention, the main flow conduit includes a section restriction forming a milk and air suction system based on the Venturi effect. Such a configuration of the milk frothing device allows controlling the amount of air and the amount of milk entering the mixing chamber, without requiring the presence of complex and expensive intake means.

According to one embodiment of the invention, the main flow conduit is configured so that a hot water/vapor flow in the main flow conduit from the hot water/vapor inlet orifice and up to the mixing chamber generates a vacuum in the milk supply conduit and a vacuum in the air supply conduit and leads to a suction of milk and air into the main flow conduit.

According to one embodiment of the invention, the mixing chamber is of the cyclonic type and extends vertically, the main flow conduit opening into an upper part of the mixing chamber and the outlet orifice being located in a lower part of the mixing chamber. Such a configuration of the mixing chamber promotes mixing of air, milk and hot water or steam introduced into the mixing chamber.

According to one embodiment of the invention, the main flow conduit opens into a high point of the mixing chamber and the outlet orifice is located at a low point of the mixing chamber.

According to one embodiment of the invention, the main flow conduit opens tangentially into the mixing chamber. Such a configuration of the main flow conduit promotes mixing of air, milk and hot water or steam introduced into the mixing chamber.

According to one embodiment of the invention, the main flow conduit is entirely delimited by the mixing part and the closure part. Thus, the milk proteins, contained in the milk flowing in the main flow conduit, are not likely to deform the latter, and therefore to have an impact on the amount of air introduced into the mixing chamber.

According to one embodiment of the invention, the mixing part includes an upper face in which the main flow conduit is formed and into which the mixing chamber opens.

According to one embodiment of the invention, the mixing part includes a receiving groove which is formed in the upper face of the mixing part and in which the seal is housed.

According to one embodiment of the invention, the mixing part includes a bearing wall which extends around the mixing chamber and the main flow conduit and which partially delimits the receiving groove, the bearing wall projecting from the upper face of the support part and the closure part being configured to bear against the bearing wall. The presence of such a bearing wall limits the risks of milk leakage towards the seal, and therefore the risks of degradation of the latter by the milk proteins contained in the milk flowing in the main flow conduit.

According to one embodiment of the invention, the mixing part and the closure part are generally circular and extend substantially coaxially when the closure part occupies the closed position.

According to one embodiment of the invention, the mixing part includes an air intake channel configured to be closed by the closure part, the air intake channel connecting the air supply conduit to the main flow conduit and the seal extending around the air intake channel.

According to one embodiment of the invention, the air intake channel is formed in the upper face of the mixing part.

According to one embodiment of the invention, the closure part includes the air supply conduit. Such an arrangement of the air supply conduit allows substantially limiting the risks of deterioration of the air supply conduit by the milk proteins contained in the milk flowing in the main flow conduit, and therefore guaranteeing the intake of a controlled amount of air into the mixing chamber.

According to one embodiment of the invention, the mixing part includes the milk supply conduit. Such an arrangement of the milk supply conduit allows substantially limiting the risks of deterioration of the milk supply conduit by the milk proteins contained in the milk flowing in the milk supply conduit, and therefore guaranteeing the intake of a controlled amount of milk into the mixing chamber.

According to one embodiment of the invention, the mixing part is made in one piece.

According to one embodiment of the invention, the milk supply conduit comprises a calibrated flow passage configured to define a predetermined milk flow rate in the milk supply conduit. These arrangements allow guaranteeing the intake of a predetermined amount of milk into the mixing chamber, and therefore obtaining a milk froth having a suitable consistency.

According to one embodiment of the invention, the milk supply conduit opens into the main flow conduit close to the section restriction.

According to one embodiment of the invention, the air intake channel opens into the main flow conduit close to the section restriction.

According to one embodiment of the invention, the main flow conduit includes:

- a first conduit portion which is located upstream of the section restriction and which extends up to the section restriction, the first conduit portion having a flow cross-section which decreases in the direction of the section restriction, and
- a second conduit portion which is located downstream of the section restriction and which extends from the section restriction, the second conduit portion having a flow cross-section which increases in the direction of the mixing chamber.

According to one embodiment of the invention, the main flow conduit is configured to allow a first mixing of vapor, milk and air respectively from the hot water/vapor inlet orifice, the milk supply conduit and the air intake channel, before their arrival in the mixing chamber.

According to one embodiment of the invention, the seal is continuous.

According to one embodiment of the invention, the seal has a constant cross-section. However, the seal could have a non-constant cross-section to improve the sealing between the mixing part and the closure part in the case of strong deformation of the latter.

According to one embodiment of the invention, the mixing part includes a milk pouring conduit fluidly connected to the outlet orifice of the mixing chamber and configured to be located vertically above a container, such as a cup.

According to one embodiment of the invention, the milk frothing device includes a milk reservoir comprising an upper opening, the mixing part being arranged at the upper opening, and is for example housed at least partially in the milk reservoir.

According to one embodiment of the invention, the holding system is configured to removably, that is to say temporarily and reversibly, fasten the mixing part and the closure part to the milk reservoir.

According to another embodiment of the invention, the milk frothing device includes a connecting device which is separate from the holding system and which is configured to removably, that is to say temporarily and reversibly, fasten the mixing part and the closure part to the milk reservoir.

According to one embodiment of the invention, the milk frothing device includes an immobilization device configured to immobilize the mixing part in rotation with respect to the milk reservoir when the mixing part is received in the milk reservoir.

According to one embodiment of the invention, the at least one fastening element is provided on the mixing part and/or on the milk reservoir.

According to one embodiment of the invention, the mixing part includes a mixing body configured to partially close the milk reservoir and to be removable with respect to the milk reservoir.

According to one embodiment of the invention, the mixing body is provided with a tubular mounting portion configured to be mounted in the milk reservoir, and more particularly to be inserted into the milk reservoir via the upper opening of the milk reservoir.

According to one embodiment of the invention, the mixing part and the closure part are configured to close the milk reservoir and to be removable with respect to the milk reservoir. In other words, the mixing part and the closure part form a lid configured to close the milk reservoir.

According to one embodiment of the invention, the closure part is configured to cover the mixing part.

According to one embodiment of the invention, the milk supply conduit includes a milk suction tube extending vertically and opening into a lower part of the milk reservoir.

According to one embodiment of the invention, the closure part includes a filling opening and a flap movable between an open position in which the flap at least partially releases the filling opening and enables an introduction of milk into the milk reservoir and a closed position in which the flap at least partially seals the filling opening.

According to one embodiment of the invention, the mixing part includes a passage opening configured to be located opposite the filling opening.

According to one embodiment of the invention, the recessed guide member delimits the passage opening provided on the mixing part, and the projecting guide member is configured to be introduced into said passage opening.

According to one embodiment of the invention, the milk frothing device further includes an air flow rate adjustment device configured to adjust a flow rate of air flowing in the air supply conduit. Such a configuration of the milk frothing device according to the present invention, and more particularly the presence of the air flow rate adjustment device, allows a user to adapt the consistency of the obtained milk froth according to his wishes. The user can for example adjust the flow rate of air introduced into the mixing chamber in order to obtain a more or less firm milk froth.

The present invention further concerns an automatic coffee machine including a hot water/vapor outlet nozzle, a boiler producing hot water and/or vapor to feed said hot water/vapor outlet nozzle, and a milk frothing device according to the present invention, the hot water/vapor inlet orifice of the milk frothing device being connected to the hot water/vapor outlet nozzle.

By automatic coffee machine, it should be understood that the coffee machine comprises in particular a brewing chamber which can be fed with ground coffee by a grain grinder incorporated in the machine, or a brewing chamber which can receive a coffee capsule or pod or a brewing chamber formed by a spoon intended to be filled with ground coffee and manually emptied.

BRIEF DESCRIPTION OF FIGURES

The invention will be better understood using the following description with reference to the appended schematic drawings representing, as a non-limiting example, an embodiment of this milk frothing device.

DETAILED DESCRIPTION

Figure 1:
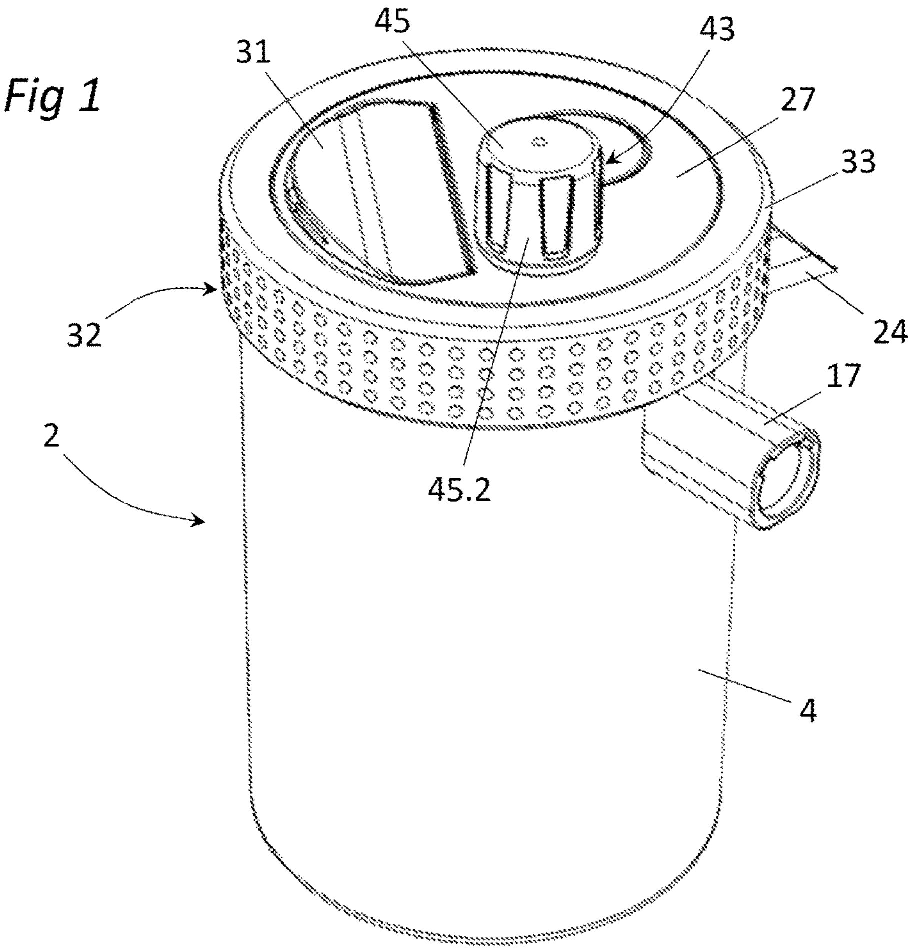
FIG. 1 is a perspective top view of a milk frothing device according to the present invention.
Figure 2:
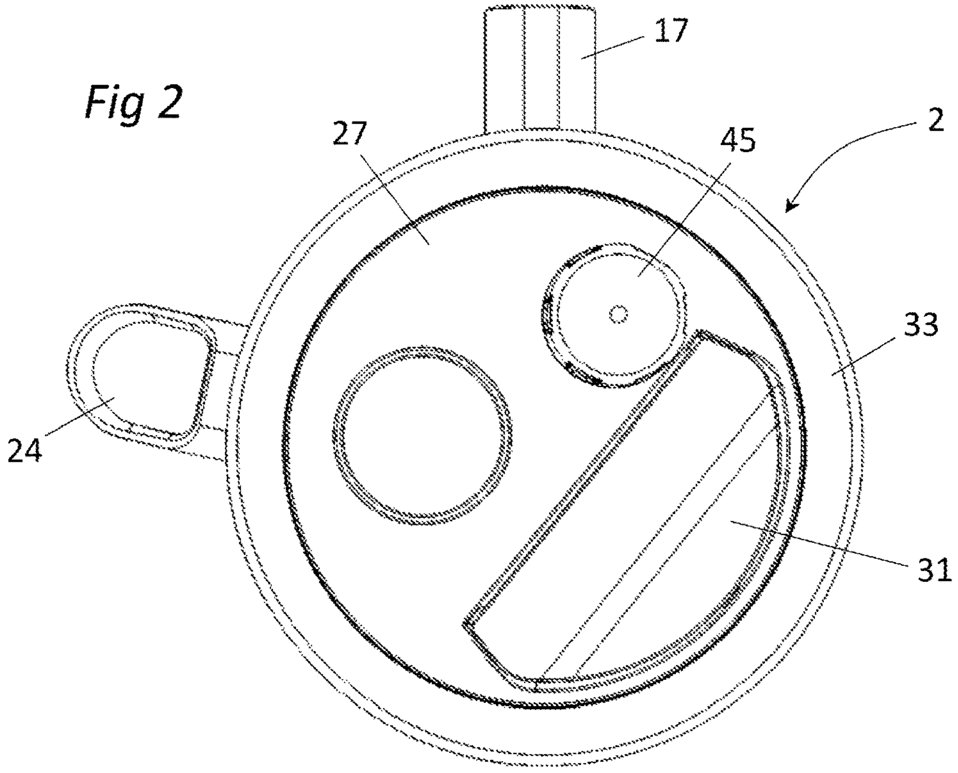
FIG. 2 is a top view of the milk frothing device of FIG. 1.

FIGS. 1 to 18 show a milk frothing device 2 intended to cooperate with an automatic coffee machine 3.

The milk frothing device 2 includes a milk reservoir 4 delimiting an internal volume intended to contain milk and comprising an upper opening 5. The milk reservoir 4 can for example have a generally cylindrical shape, and have a circular traversable section. However, the milk reservoir 4 could also have a completely different shape, and for example have an oblong or even rectangular traversable section.

The milk frothing device 2 further includes a mixing part 6 arranged at the upper opening 5. The mixing part 6 more particularly includes a mixing body 7 provided with an upper face 8 which is generally planar. The mixing body 7 is configured to partially close the milk reservoir 4 and to be removable with respect to the milk reservoir 4. The mixing body 7 can for example include a tubular mounting portion 9 configured to be mounted in the milk reservoir 4, and more particularly to be inserted into the milk reservoir 4 via the upper opening of the milk reservoir 4.

Advantageously, the milk frothing device 2 includes an immobilization device configured to immobilize the mixing body 7 in rotation with respect to the milk reservoir 4 when the tubular mounting portion 9 is received in the milk reservoir 4. The immobilization device can for example include immobilization ribs 11 provided on an upper peripheral edge of the milk reservoir 4 and distributed about a central axis of the milk reservoir 4, and immobilization grooves 12 provided on the mixing body 7 and configured to cooperate respectively with the immobilization ribs 11.

The mixing body 7 further includes a mixing chamber 13 which opens into the upper face 8 of the mixing body 7 and which is provided with an outlet orifice 14, and furthermore a main flow conduit 15 formed in the upper face 8 of the mixing body 7 and opening into the mixing chamber 13. According to the embodiment shown in the figures, the mixing chamber 13 is of the cyclonic type and extends vertically, and the main flow conduit 15 opens tangentially into the mixing chamber 13. Advantageously, the main flow conduit 15 opens into an upper part of the mixing chamber 13, and for example into a high point of the mixing chamber 13, and the outlet orifice 14 is located in a lower part of the mixing chamber 13, and is for example located at a low point of the mixing chamber 13.

Figure 7:
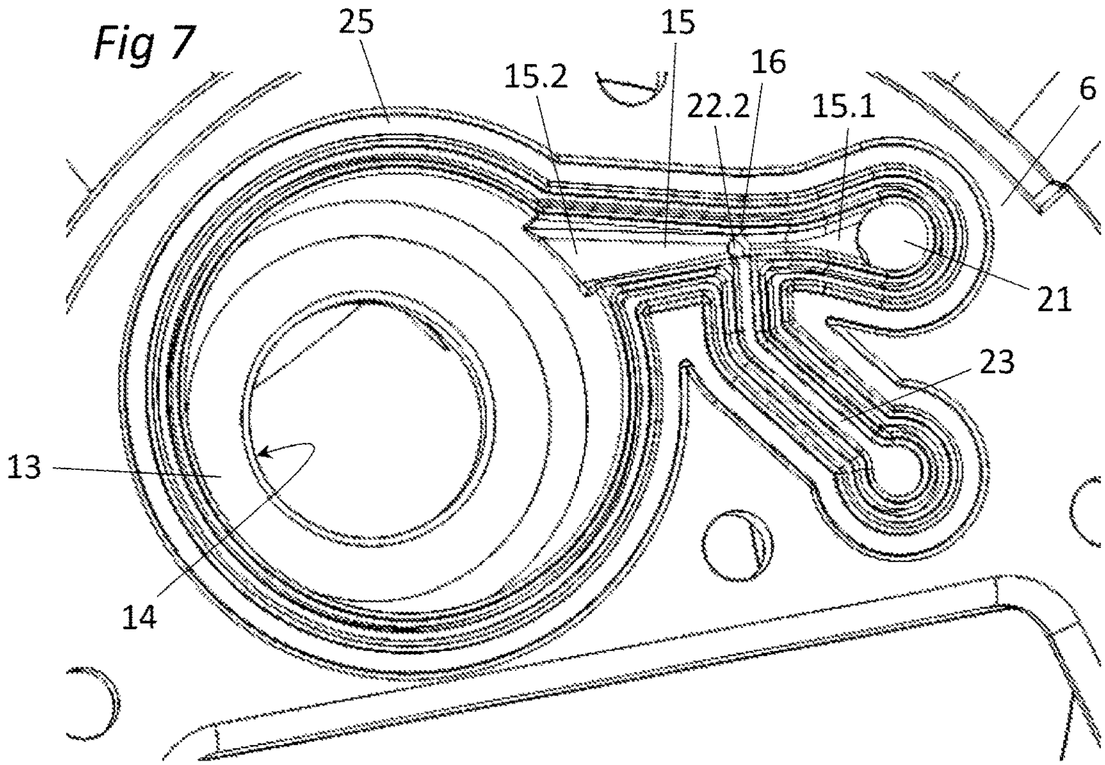
FIG. 7 is a partial top view of the mixing part of FIG. 6 equipped with the seal of FIG. 4.
Figure 8:
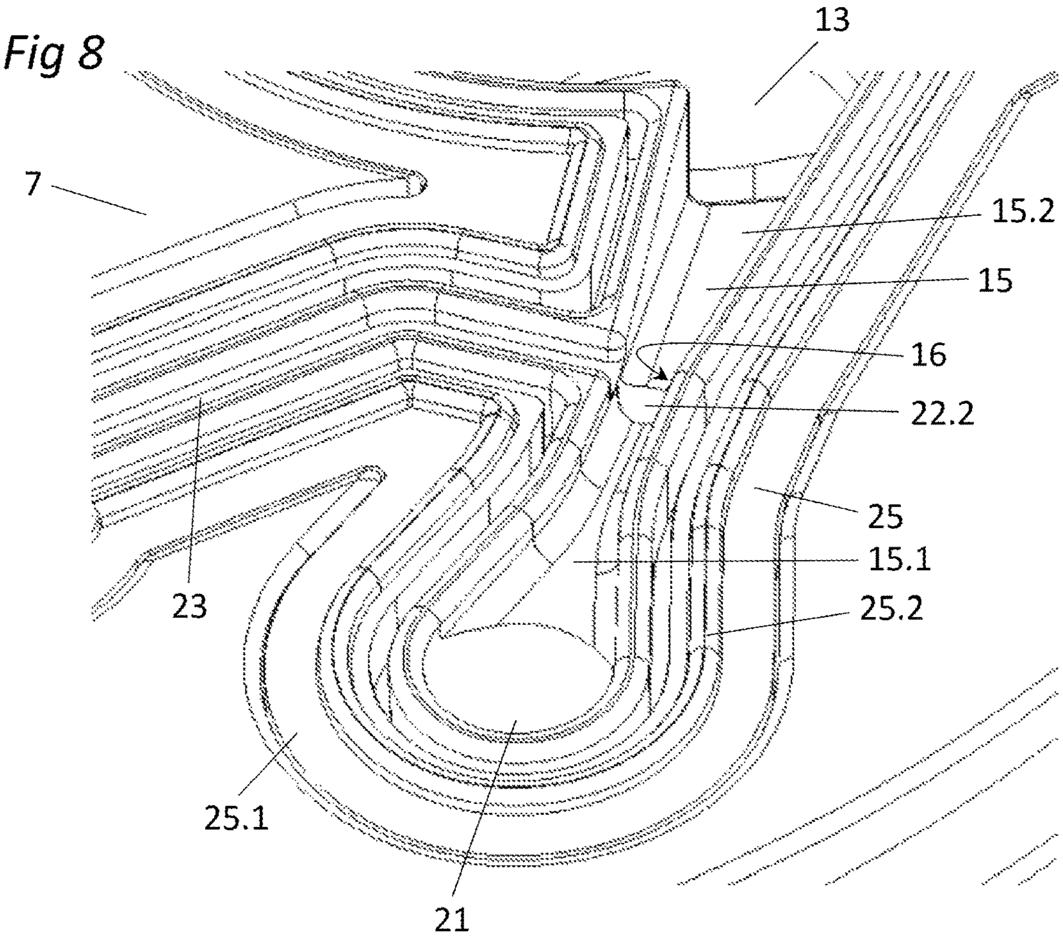
FIG. 8 is a partial perspective top view of the mixing part equipped with the seal of FIG. 4.
Figure 9:
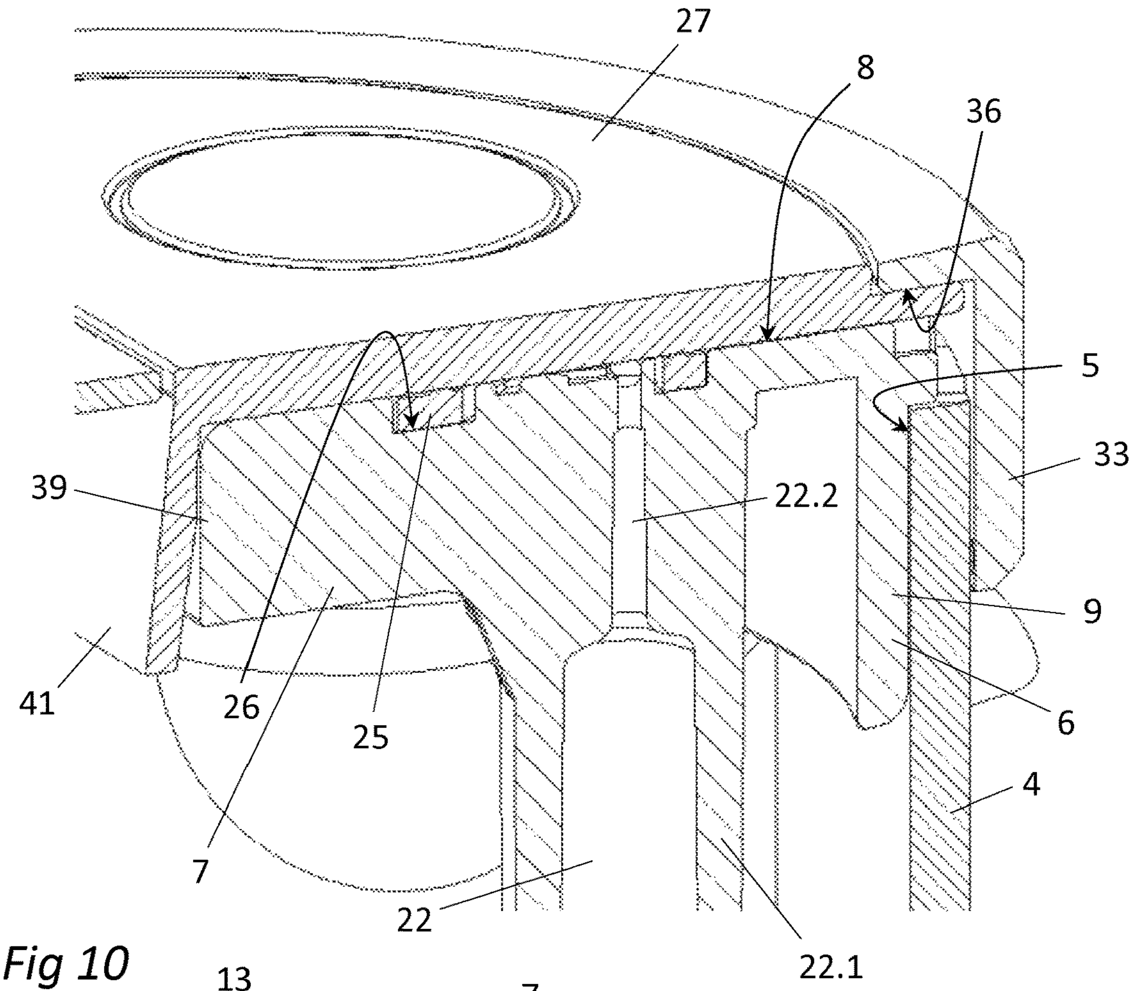
FIG. 9 is a partial perspective, longitudinally truncated view, of the milk frothing device of FIG. 1.
Figure 10:
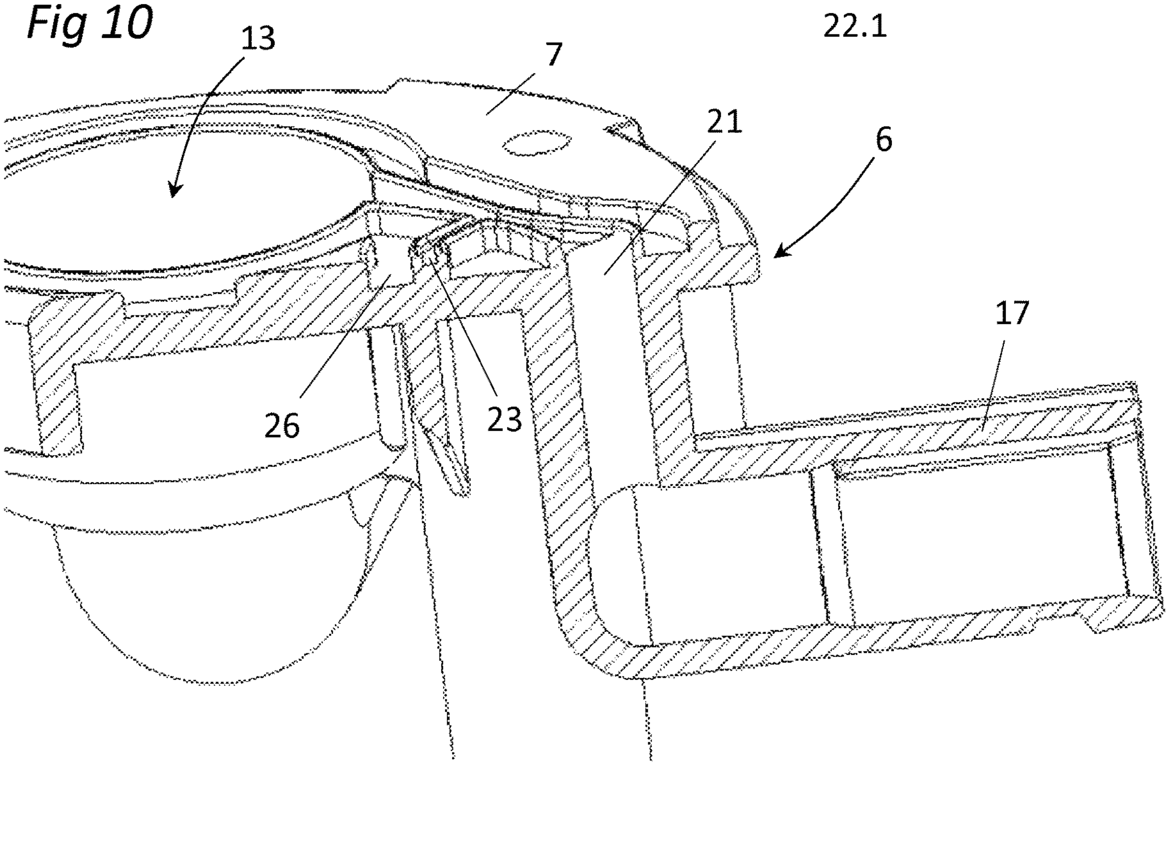
FIG. 10 is a partial perspective, longitudinally truncated view, of the mixing part of FIG. 6.
Figure 11:
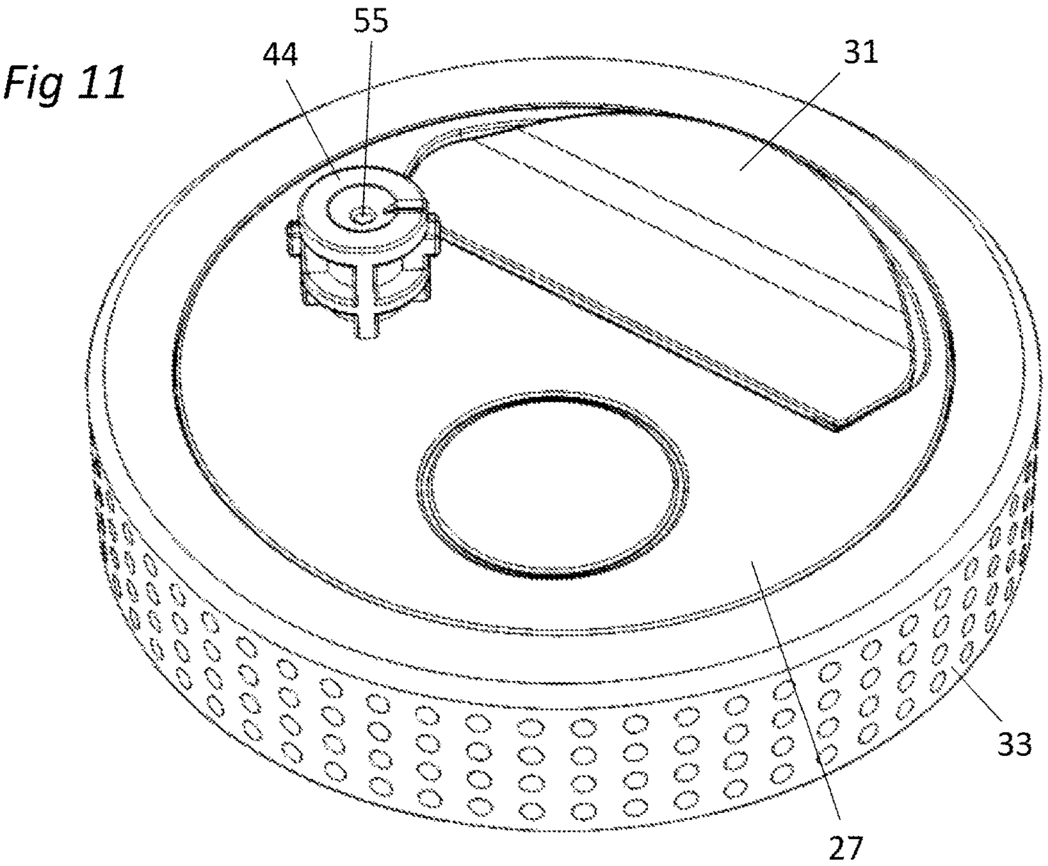
FIG. 11 is a perspective top view of a subset of the milk frothing device of FIG. 1.

As shown more particularly in FIG. 7, the main flow conduit 15 includes a section restriction 16 located for example in a central portion of the main flow conduit 15, a first conduit portion 15.1 which is located upstream of the section restriction 16 and which extends up to the section restriction 16, and a second conduit portion 15.2 which is located downstream of the section restriction 16 and which extends from the section restriction 16 and up to the mixing chamber 13. Advantageously, the first conduit portion 15.1 has a flow cross-section which decreases in the direction of the section restriction 16, and the second conduit portion has a flow cross-section which increases in the direction of the mixing chamber 13.

The mixing body 7 also includes a connection nozzle 17 configured to be connected to a hot water/vapor outlet nozzle of the automatic coffee machine 3, and more particularly to be fluidly connected to a boiler which equips the automatic coffee machine 3 and which is configured to produce hot water and/or vapor. Advantageously, the connection nozzle 17 extends radially with respect to a central axis of the mixing body 7, and is configured to extend radially with respect to the central axis of the milk reservoir 4.

The mixing body 7 further includes a hot water/vapor inlet orifice 21 which is fluidly connected to the connection nozzle 17 and which opens into the first conduit portion 15.1 and more particularly opposite the mixing chamber 13. The main flow conduit 15 is thus configured to fluidly connect the hot water/vapor inlet orifice 21 to the mixing chamber 13, and to allow a hot water/vapor flow in the main flow conduit 15 and up to the mixing chamber 13.

The milk frothing device 2 also includes a milk supply conduit 22 fluidly connected to the main flow conduit 15, and therefore configured to be fluidly connected to the mixing chamber 13 via the main flow conduit 15. According to the embodiment shown in the figures, the mixing part 6 includes the milk supply conduit 22, and more particularly the mixing body 7 and the milk supply conduit 22 are made in one piece.

Figure 3:
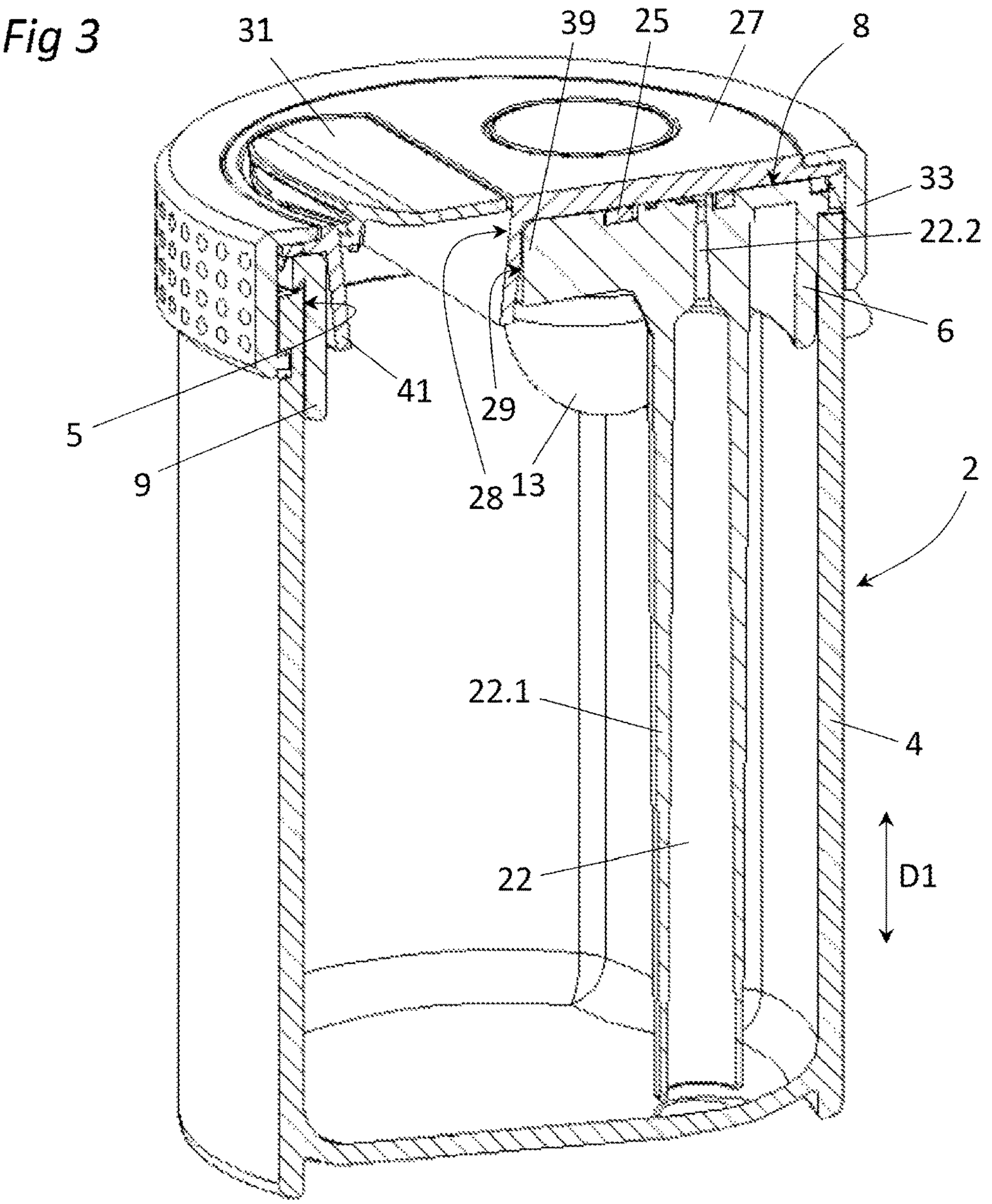
FIG. 3 is a perspective, longitudinally truncated view, of the milk frothing device of FIG. 1.

As shown more particularly in FIG. 3, the milk supply conduit 22 includes a milk suction tube 22.1 extending vertically and opening into a lower part of the milk reservoir 4, and a calibrated flow passage 22.2 located downstream of the milk suction tube 22.1 and opening into the main flow conduit 15 at the section restriction 16. The calibrated flow passage 22.2 is more particularly configured to define a predetermined milk flow rate in the milk supply conduit 22.

According to the embodiment shown in the figures, the mixing body 7 further includes an air intake channel 23 which is formed in the upper face 8 of the mixing body 7 and which opens into the main flow conduit 15 at the section restriction 16. The air intake channel 23 is thus configured to be fluidly connected to the mixing chamber 13 via the main flow conduit 15.

The previously described section restriction 16 induces an increase in the speed of the vapor flowing in the main flow conduit 15, which generates a vacuum in the milk supply conduit 22 and in the air intake channel 23. The section restriction 16 is therefore more particularly configured to form a milk and air suction system based on the Venturi effect. The main flow conduit 15 is thus configured so that a hot water/vapor flow in the main flow conduit 15 from the hot water/vapor inlet orifice 21 and up to the mixing chamber 13 generates a vacuum in the milk supply conduit 22 and a vacuum in the air intake channel 23 and consequently leads to a suction of milk and air in the main flow conduit 15 and a flow of milk and air sucked up to the mixing chamber 13. In addition, the second conduit portion 15.2, which has a flow cross-section which increases in the direction of the mixing chamber 13, promotes a first mixing of vapor, milk and air respectively from the hot water/vapor inlet orifice 21, the milk supply conduit 22 and the air intake channel 23, before their arrival in the mixing chamber 13.

The mixing body 7 further includes a milk pouring conduit 24 fluidly connected to the outlet orifice 14 of the mixing chamber 13, and configured to allow hot milk and milk froth to be poured into a container, such as a cup, arranged vertically below the milk pouring conduit 24. Advantageously, the milk pouring conduit 24 is configured to extend radially with respect to the central axis of the milk reservoir 4.

Figure 4:
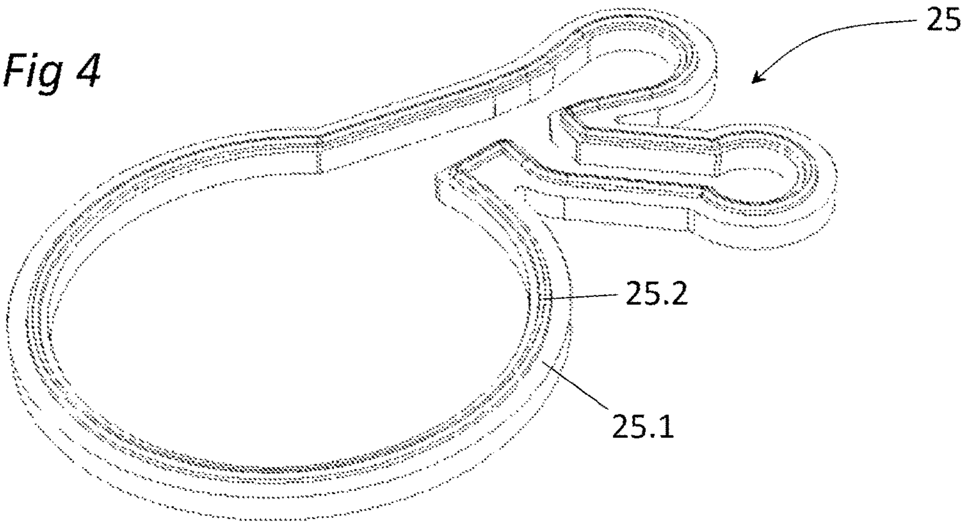
FIG. 4 is a perspective view of a seal of the milk frothing device of FIG. 1.

As shown more particularly in FIGS. 4 and 7, the milk frothing device 2 includes a seal 25 extending around the mixing chamber 13, the main flow conduit 15 and the air intake channel 23. To this end, the mixing body 7 includes a receiving groove 26 formed in the upper face 8 of the mixing body 7 and in which the seal 25 is housed.

According to the embodiment shown in the figures, the seal 25 includes a seal body entirely housed in the receiving groove 26, and a sealing lip 25.2 extending along the seal body 25.1 and projecting out of the receiving groove 26. Advantageously, the seal 25 is continuous and can for example have a constant cross-section.

The milk frothing device 2 includes in addition a closure part 27 configured to cover the mixing body 7 and to bear against the mixing body 7. The mixing body 7 may possibly include a bearing wall 7.1 which extends around the mixing chamber 13 and the main flow conduit 15 and which internally delimits the receiving groove 26, the bearing wall 7.1 projecting from the upper face 8 of the mixing body 7 and the closure part 27 then being configured to bear against an upper edge of the bearing wall 7.1.

As shown in FIG. 3, the closure part 27 is generally planar, and the seal 25 is thus arranged at a junction area between the mixing part 6 and the closure part 27 which is generally planar. According to the embodiment shown in the figures, the mixing part 6 and the closure part 27 are generally circular and extend substantially coaxially with the central axis of the milk reservoir 4.

The mixing part 6 and the closure part 27 are configured to close the milk reservoir 4 and to be removable with respect to the milk reservoir 4. The mixing part 6 and the closure part 27 thus form a lid configured to close the milk reservoir 4.

According to the embodiment shown in the figures, the closure part 27 includes a filling opening 28 configured to be located opposite a passage opening 29 provided on the mixing body 7 and opening into the milk reservoir 4, and a flap 31 movable, and for example pivotally mounted, between an open position in which the flap 31 at least partially releases the filling opening 28 and enables an introduction of milk into the milk reservoir 4 and a closed position in which the flap 31 at least partially seals the filling opening 28.

The closure part 27 is more particularly movably mounted relative to the mixing part 6 between a closed position in which the closure part 27 closes the mixing chamber 13, the main flow conduit 15 and the air intake channel 23, and an open position in which the mixing chamber 13, the main flow conduit 15 and the air intake channel 23 are open and accessible for cleaning.

Advantageously, the milk frothing device 2 also includes a holding system 32 configured to hold the closure part 27 in the closed position and to ensure a compression of the seal 25 when the closure part 27 is in the closed position. The holding system 32 is more particularly configured to press the closure part 27 against the upper face 8 of the mixing body 7 when the closure part 27 is in the closed position, so as to compress the seal 25, and more particularly the sealing lip 25.2 of the seal 25. According to the embodiment shown in the figures, the holding system 32 is also configured to removably, that is to say temporarily and reversibly, fasten the mixing part 6 and the closure part 27 to the milk reservoir 4. However, such a fastening of the mixing part 6 and the closure part 27 to the milk reservoir 4 could be made by a connecting device separate from the holding system 32.

As shown in FIG. 3, the holding system 32 includes a locking part 33, such as a locking ring, movably mounted in rotation relative to the closure part 27 about an axis of rotation A and between a release position in which the locking part 33 enables a displacement of the closure part 27 towards the open position and a locking position in which the locking part 33 prevents a displacement of the closure part 27 towards the open position. The axis of rotation A is advantageously substantially parallel to, and for example collinear with, the central axis of the milk reservoir 4 when the mixing part 6 is received in the milk reservoir 4 and the closure part 27 occupies the closed position.

According to the embodiment shown in the figures, the closure part 27 is configured to occupy an intermediate position located between the closed position and the open position and in which the closure part 27 rests on the sealing lip 25.2 of the seal 25 and is therefore located opposite the mixing chamber 13 and the main flow conduit 15 and is spaced apart from the mixing part 6, and the holding system 32 is configured to displace the closure part 27 from the intermediate position to the closed position and in the direction of the mixing part 6, and therefore to move the closure part 27 closer to the mixing part 6, when the locking part 33 is displaced from the release position to the locking position.

Figure 5:
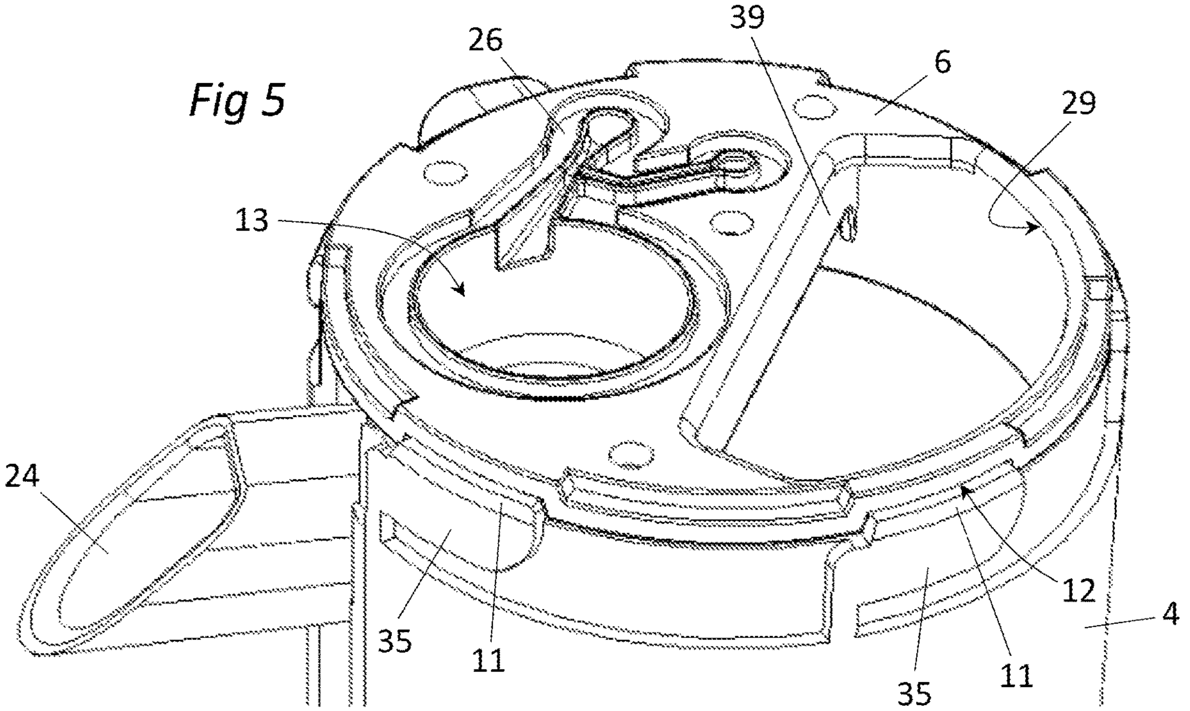
FIG. 5 is a partial perspective top view of the milk frothing device of FIG. 1.
Figure 6:
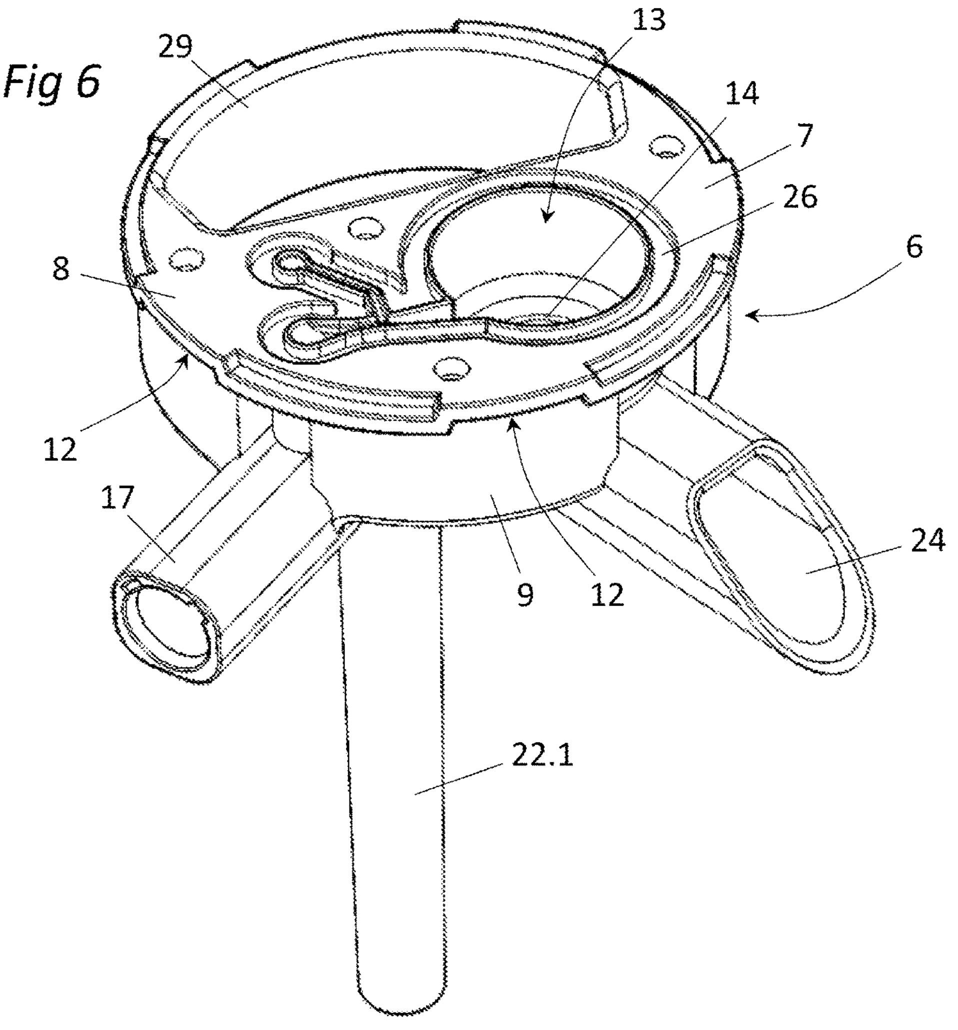
FIG. 6 is a perspective top view of a mixing part of the milk frothing device of FIG. 1.
Figure 12:
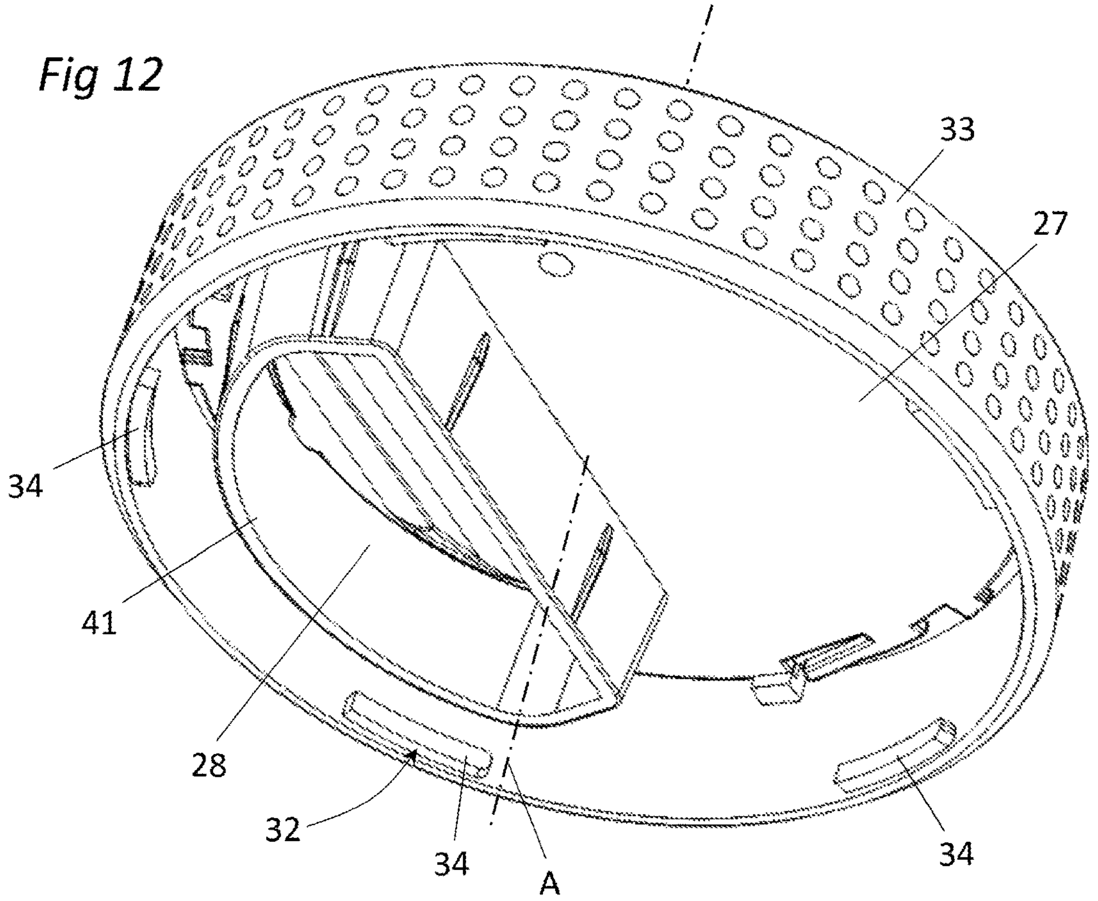
FIG. 12 is a perspective bottom view of the subset of FIG. 11.

As shown in FIGS. 5 and 12, the holding system 32 further includes a plurality of fastening members 34, such as fastening ramps or fastening grooves, provided on the locking part 33 and distributed about the axis of rotation A, and a plurality of fastening elements 35, such as fastening lugs or fastening notches, provided on the milk reservoir 4 and distributed about the central axis of the milk reservoir 4. The fastening elements 35 are configured to cooperate respectively with the fastening members 34 provided on the locking part 33 during a rotation of the locking part 33 from the release position to the locking position, so as to displace the locking part 33 in the direction of the mixing part 6. The fastening members 34 and the fastening elements 35 can for example form a bayonet or screw-nut type fastening system. According to the embodiment shown in the figures, the fastening members 34 are provided on an internal surface of the locking part 33, and the fastening elements 35 are provided on an external surface of the milk reservoir 4.

Advantageously, the locking part 33 includes a bearing face 36 (see in particular FIG. 9) which extends transversely to the axis of rotation A and which is configured to displace the closure part 27 towards the mixing part 6 and parallel to the axis of rotation A during a rotation of the locking part 33 from the release position to the locking position. The bearing face 36 is more particularly configured to slide on the closure part 27 during a rotation of the locking part 33 between the release position and the locking position. The bearing face 36 is annular and is configured to bear against a peripheral edge of the closure part 27.

According to the embodiment shown in the figures, the locking part 33 is captively mounted on the closure part 27, so that the locking part 33 and the closure part 27 form a non-detachable subset.

Figure 13:
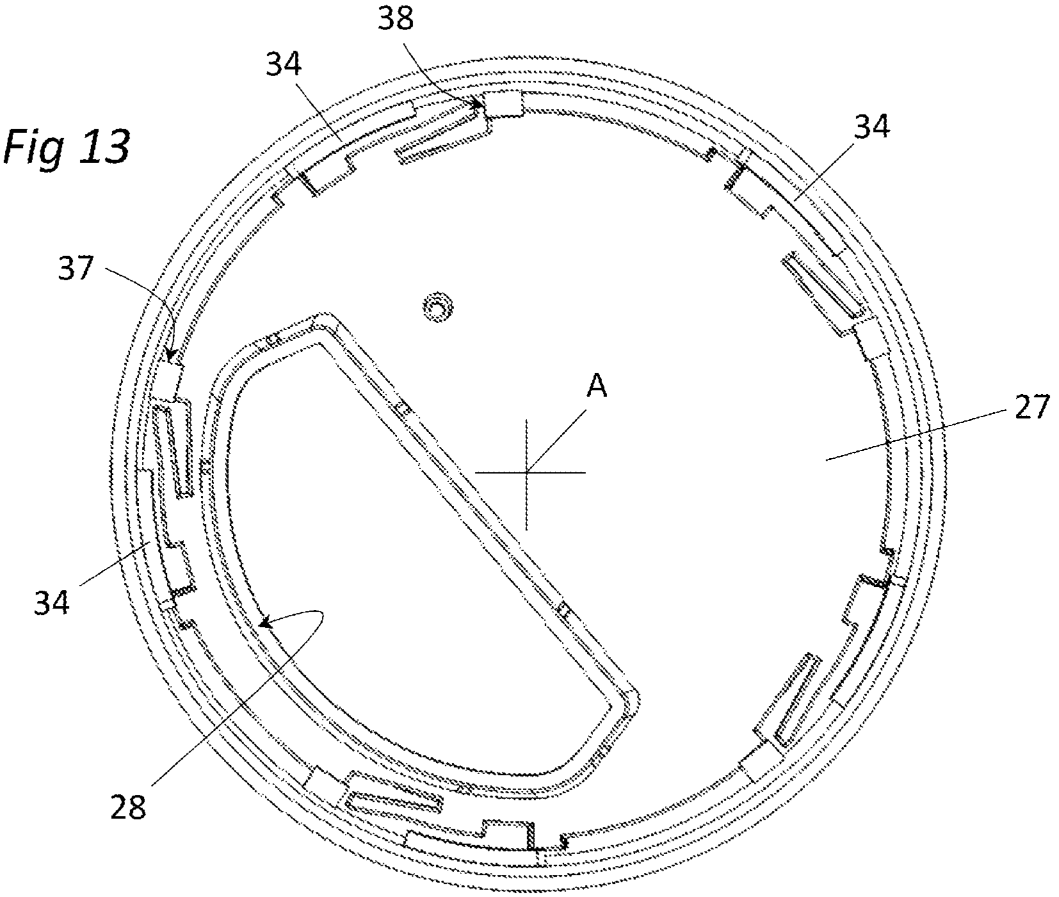
FIG. 13 is a bottom view of the subset of FIG. 11.
Figure 14:
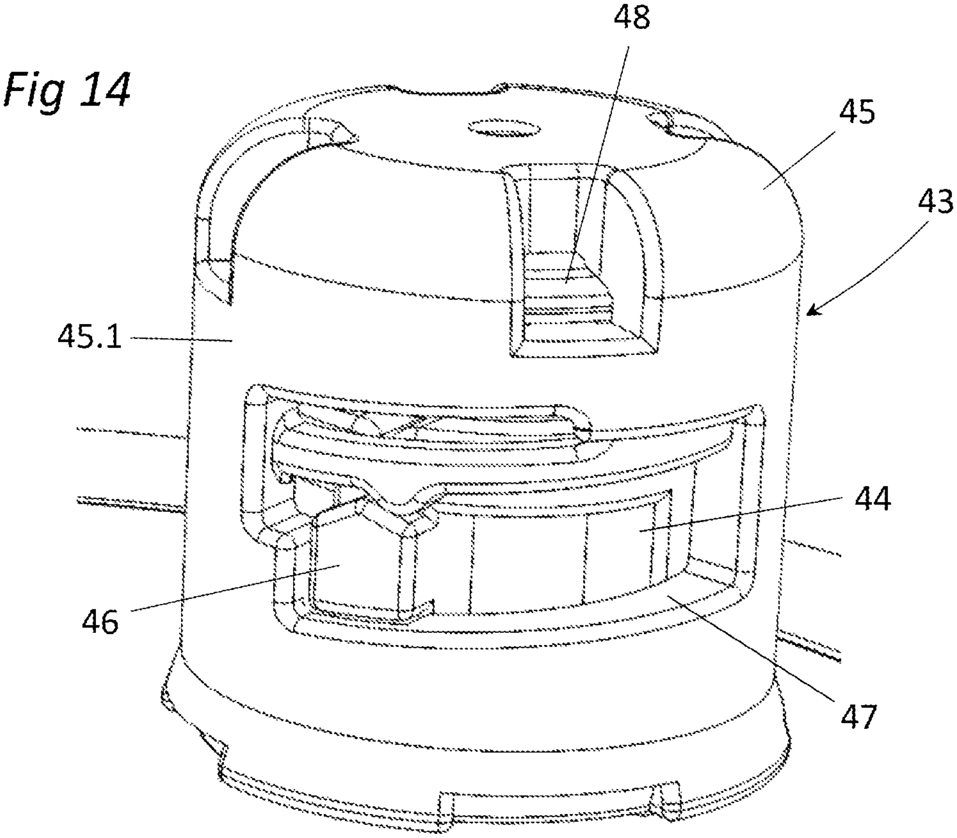
FIG. 14 is a partial perspective top view of an air flow rate adjustment device of the milk frothing device of FIG. 1.

As shown more particularly in FIG. 13, the milk frothing device 2 includes an angular stroke limiting device configured to limit an angular stroke of the locking part 33 relative to the closure part 27. The angular stroke limiting device can for example include one or several first end stop(s) 37 provided on the locking part 33 and configured to prevent a rotation of the locking part 33, in a first direction of rotation, beyond the release position, and one or several second end stop(s) 38 provided on the locking part 33 and configured to prevent a rotation of the locking part 33, in a second direction of rotation, beyond the locking position.

Advantageously, the holding system 32 is also configured to confer on the closure part 27 only one translational degree of freedom in a direction of translation D1, which is for example perpendicular to the junction area and therefore parallel to the axis of rotation A, when the closure part 27 is displaced between the intermediate position and the closed position. To this end, the holding system 32 includes a first guide member 39, such as a recessed guide member, and a second guide member 41, such as a projecting guide member, secured respectively to the mixing part 6 and the closure part 27 and configured to be slidably mounted one inside the other in the direction of translation D1.

The first and second guide members 39, 41 have complementary and non-circular cross-sections, and are configured to guide the closure part 27 in translation relative to the mixing part 6 and in the direction of translation D1 when the closure part 27 is displaced between the intermediate position and the closed position. According to the embodiment shown in the figures, the first guide member 39 delimits the passage opening 29 provided on the mixing body 7, and the second guide member 41 projects downwards from a lower face of the closure part 27 and is configured to be introduced into the passage opening 29. However, according to a variant of the invention, the first and second guide members 39, 41 could be laterally offset with respect to the filling opening 28 and the passage opening 29.

Figure 17:
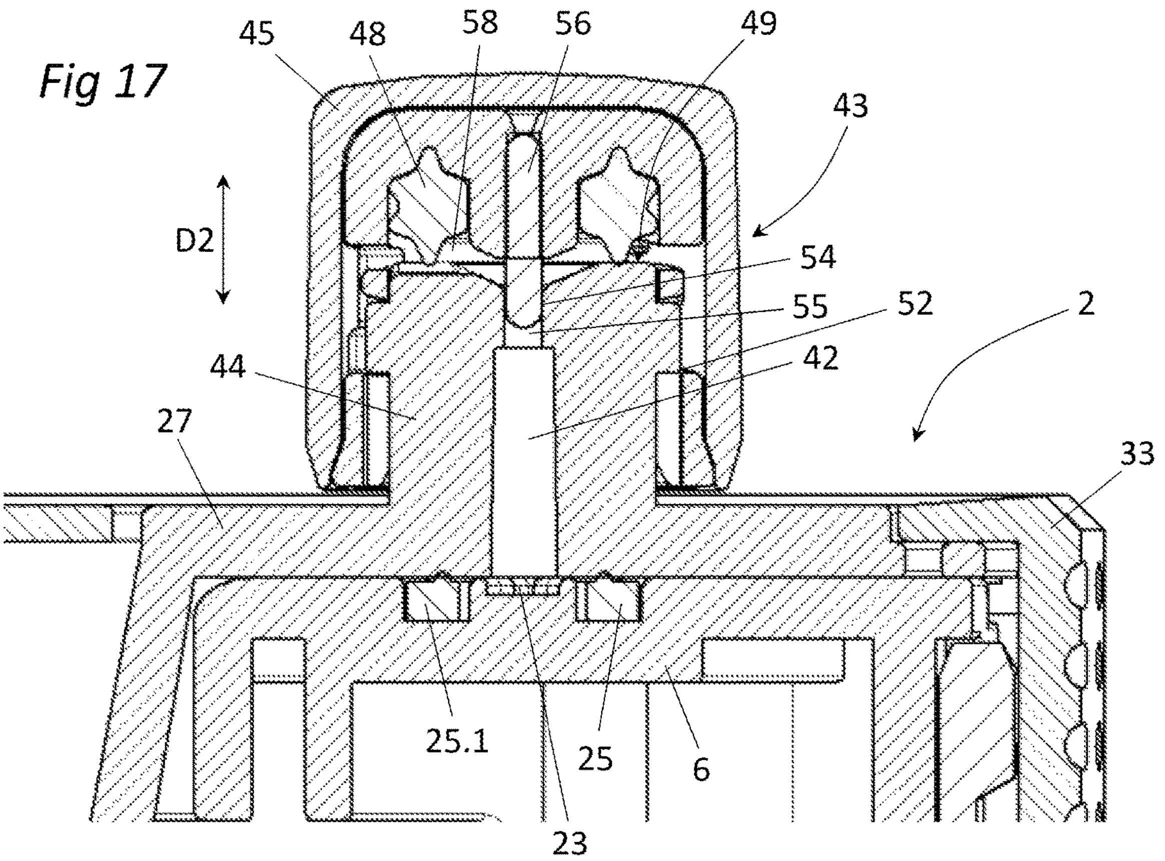
FIG. 17 is a sectional top view of the air flow rate adjustment device of FIG. 14.
Figure 18:
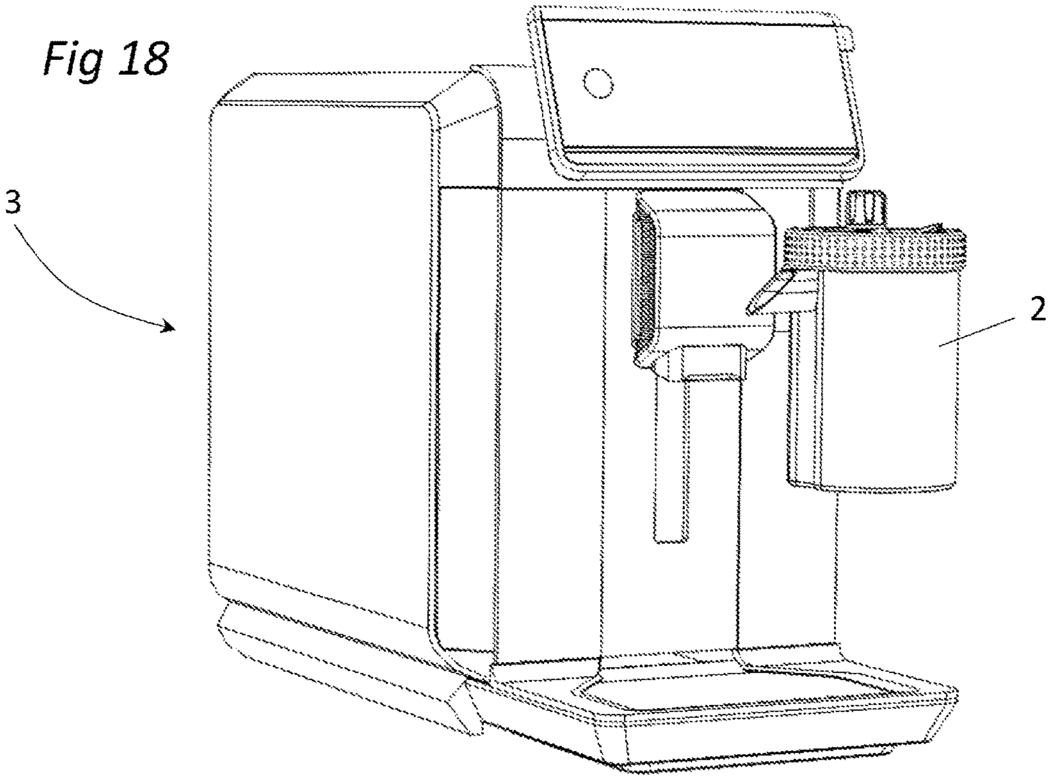
FIG. 18 is a perspective view of an automatic coffee machine equipped with the milk frothing device of FIG. 1.

As shown more particularly in FIG. 17, the closure part 27 further includes an air supply conduit 42 connected to the main flow conduit 15 via the air intake channel 23, and an air flow rate adjustment device 43 configured to adjust a flow rate of air flowing in the air supply conduit 42. However, according to a variant of the invention, the mixing part 6 could be devoid of the air intake channel 23, and the air supply conduit 42 could be directly connected to the main flow conduit 15.

According to the embodiment shown in the figures, the air flow rate adjustment device 43 includes a support part 44 fastened to the closure part 27 and projecting from an upper face of the closure part 27, and a flow rate adjustment member 45, such as a flow rate adjustment button, supported by the support part 44 and movably mounted, and for example movably mounted according to a helical movement, relative to the support part 44 in a direction of displacement D2 which can for example be substantially vertical when the milk frothing device 2 rests on a horizontal surface.

The flow rate adjustment member 45 and the support part 44 can for example extend coaxially with respect to each other, and the support part 44 can for example include two guide fingers 46 (see in particular FIG. 14) diametrically opposed and slidably mounted respectively in two helical guide grooves 47 provided on the flow rate adjustment member 45.

According to the embodiment shown in the figures, the flow rate adjustment member includes an adjustment part 45.1 which is configured to cover the support part 44 and which includes an upper wall covering the support part 44 and a peripheral wall having a generally tubular shape and extending around the support part 44. As shown more particularly in FIG. 1, the flow rate adjustment member 45 further includes a handling part 45.2 secured to the adjustment part 45.1 and configured to be handled by a user so as to displace the flow rate adjustment member 45 in the direction of displacement D2.

The flow rate adjustment member 45 is configured to occupy a plurality of adjustment positions offset from each other in the direction of displacement D2. Advantageously, the direction of displacement D2 is substantially parallel to the central axis of the milk reservoir 4 when the mixing part 6 is received in the milk reservoir 4 and the closure part 27 is in the closed position.

The air flow rate adjustment device 43 further includes a sealing element 48 which is annular and which is fastened to the flow rate adjustment member 45. According to the embodiment shown in the figures, the support part 44 includes a bearing surface 49, provided on an upper end face of the support part 44, which is annular and against which the sealing element 48 is capable of being compressed according to the position occupied by the flow rate adjustment member 45.

The sealing element 48 and the support part 44 are configured to delimit an air flow passage 51 (see FIG. 16) having a flow cross-section which varies according to the position occupied by the flow rate adjustment member 45. The air flow passage 51 is more particularly configured to fluidly connect an air intake opening 52, defined by the air flow rate adjustment device 43, to the air supply conduit 42. According to the embodiment shown in the figures, the air intake opening 52 is defined by a functional clearance between the flow rate adjustment member 45 and the support part 44.

The flow rate adjustment member 45 is more particularly displaceable between a maximum adjustment position in which the flow cross-section of the air flow passage 51 is maximum, and a minimum adjustment position in which the flow cross-section of the air flow passage 51 is minimum, and for example zero or substantially zero.

Figure 15:
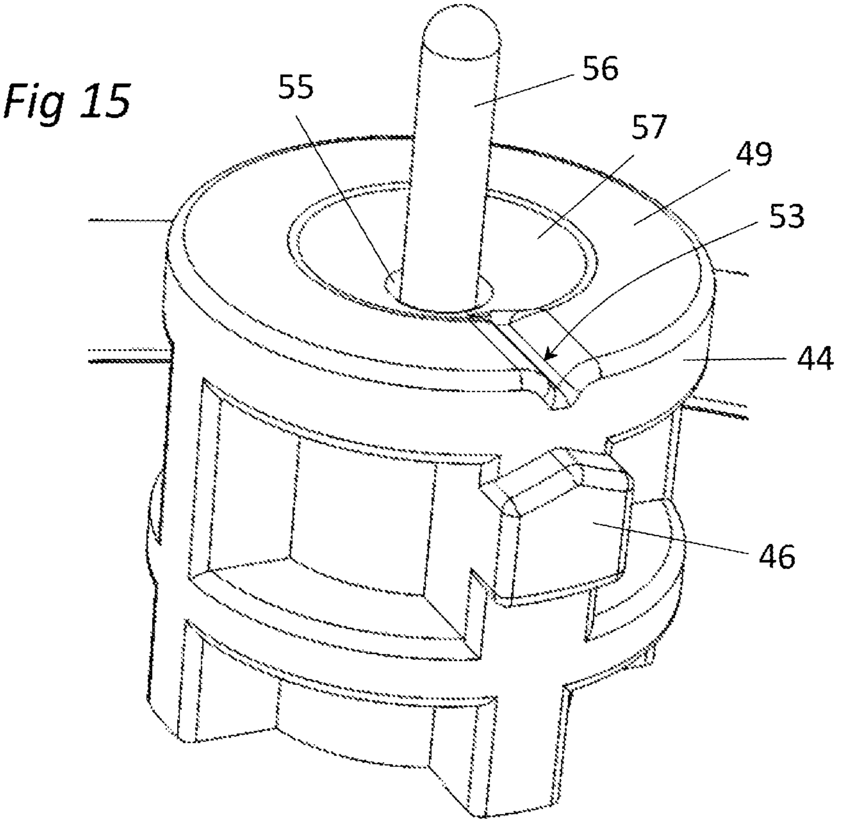
FIG. 15 is a perspective top view of a support part and a passage restriction member of the air flow rate adjustment device of FIG. 14.
Figure 16:
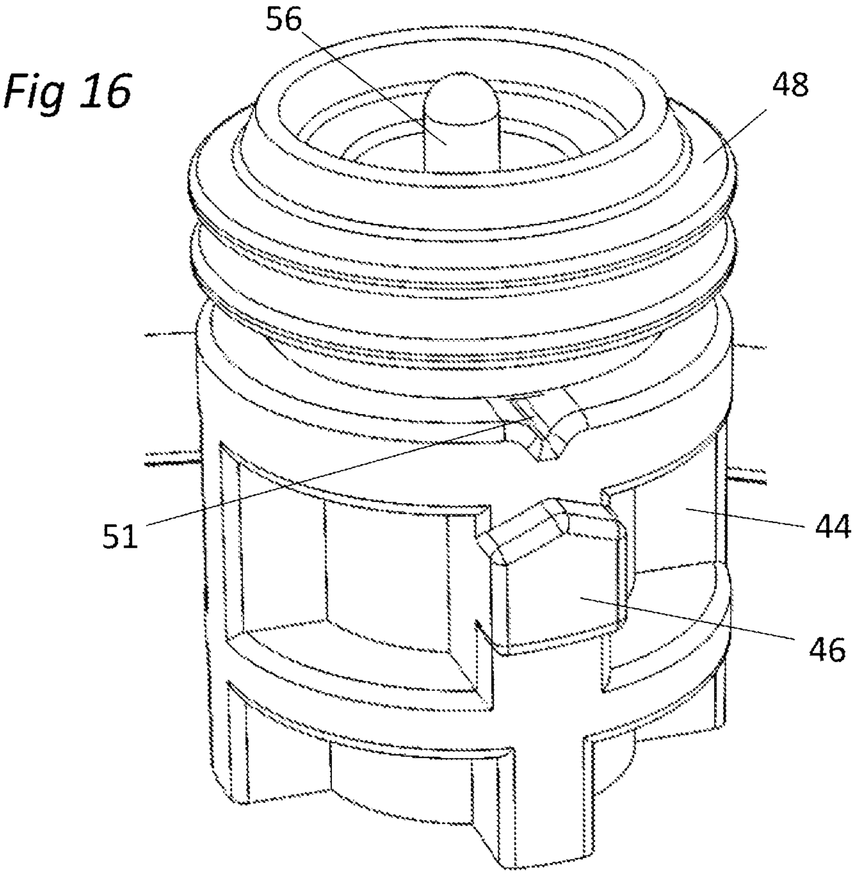
FIG. 16 is a partial perspective top view of the air flow rate adjustment device of FIG. 14.

As shown in FIG. 15, the support part 44 includes a recess 53 which is formed in the bearing surface 49 and which partially delimits the air flow passage 51. The recess 53 can for example extend radially with respect to the direction of displacement D2, and have a generally V-shaped cross-section.

As shown more particularly in FIG. 17, the air supply conduit 42 comprises a calibrated air passage 54 which is located downstream of the flow rate adjustment member 45 and which is configured to define a maximum air flow rate in the air supply conduit 42.

According to the embodiment shown in the figures, the support part 44 includes an insertion hole 55, which can for example have a diameter greater than one millimeter and preferably greater than 1.5 millimeters, oriented substantially parallel to the direction of displacement D2, and the air flow rate adjustment device 43 includes a passage restriction member 56, such as a pin or a needle with a generally cylindrical shape, having a lower end portion which is housed in the insertion hole 55. The passage restriction member 56 is secured in movement to the flow rate adjustment member 45, and is therefore movably mounted in the insertion hole 55 in the direction of displacement D2. The passage restriction member 56 is elongated and extends in a direction of extension which is parallel to the direction of displacement D2. The insertion hole 55 and the passage restriction member 56 more particularly delimit the calibrated air passage 54, so that the calibrated air passage 54 is annular.

According to the embodiment shown in the figures, the support part 44 includes a cavity 57 which opens into the upper end face of the support part 44 and into which the insertion hole 55 opens. The cavity 57 and the flow rate adjustment member 45 delimit an internal chamber 58 configured to fluidly connect the air flow passage 51 to the insertion hole 55.

Of course, the present invention is in no way limited to the described and illustrated embodiment which has been given only as an example. Modifications are still possible, in particular with regards to the constitution of the various elements or by substitution with technical equivalents, yet without departing from the scope of protection of the invention.

The invention claimed is:

1. A milk frothing device intended to cooperate with an automatic coffee machine, the milk frothing device comprising:

a mixing part comprising a mixing chamber provided with an outlet orifice, a hot water/vapor inlet orifice and a main flow conduit connecting the hot water/vapor inlet orifice to the mixing chamber;

a closure part movable relative to the mixing part between a closed position in which the closure part closes the mixing chamber and the main flow conduit and an open position in which the mixing chamber and the main flow conduit are open and accessible for cleaning;

a milk supply conduit connected to the main flow conduit;

a seal arranged at a junction area between the mixing part and the closure part and extending around the mixing chamber and the main flow conduit; and a holding system configured to hold the closure part in the closed position, wherein the closure part is configured to occupy an intermediate position located between the closed position and the open position and in which the closure part is located opposite the mixing chamber and the main flow conduit and is spaced apart from the mixing part, and in that the holding system is configured to confer on the closure part only one translational degree of freedom in a direction of translation when the closure part is displaced between the intermediate position and the closed position, the holding system further being configured to ensure a compression of the seal when the closure part is in the closed position.

2. The milk frothing device according to claim 1, wherein the holding system includes a first guide member and a second guide member secured respectively to the mixing part and the closure part and configured to be slidably mounted one inside the other, the first and second guide members being configured to guide the closure part in translation relative to the mixing part and in the direction of translation when the closure part is displaced between the intermediate position and the closed position.

3. The milk frothing device according to claim 1, wherein the holding system includes a locking part movably mounted between a release position in which the locking part enables a displacement of the closure part towards the open position and a locking position in which the locking part prevents a displacement of the closure part towards the open position.

4. The milk frothing device according to claim 3, wherein the holding system is configured to displace the closure part from the intermediate position to the closed position and in the direction of the mixing part in the direction of translation when the locking part is displaced from the release position to the locking position.

5. The milk frothing device according to claim 3, wherein the locking part is annular and is movable in rotation relative to the closure part about an axis of rotation (A) and between the release position and the locking position, the axis of rotation configured to be substantially parallel to the direction of translation when the closure part occupies the intermediate position.

6. The milk frothing device according to claim 5, wherein the locking part includes at least one fastening member configured to cooperate with at least one fastening element configured to be secured in rotation to the mixing part, the at least one fastening member being configured to cooperate with the at least one fastening element during a rotation of the locking part from the release position to the locking position so as to displace the locking part in the direction of translation and towards the mixing part, the locking part being configured to displace the closure part towards the mixing part and in the direction of translation during a rotation of the locking part from the release position to the locking position.

7. The milk frothing device according to claim 6, wherein the locking part includes a bearing face which extends transversely to the direction of translation, said bearing face configured to displace the closure part towards the mixing part and in the direction of translation during a rotation of the locking part from the release position to the locking position.

8. The milk frothing device according to claim 3, wherein the locking part is captively mounted on the closure part, so that the locking part and the closure part form a non-detachable subset.

9. The milk frothing device according to claim 1, wherein the junction area is planar, and the direction of translation is perpendicular to the junction area.

10. The milk frothing device according to claim 1, wherein the main flow conduit includes a section restriction forming a milk and air suction system based on the Venturi effect.

11. The milk frothing device according to claim 1, wherein the mixing chamber is of the cyclonic type and extends vertically, the main flow conduit opening tangentially into an upper part of the mixing chamber and the outlet orifice being located in a lower part of the mixing chamber.

12. The milk frothing device according to claim 1, which includes a milk reservoir comprising an upper opening, the mixing part being arranged at the upper opening.

13. The milk frothing device according to claim 12, wherein the holding system is configured to removably fasten the mixing part and the closure part to the milk reservoir.

14. The milk frothing device according to claim 12, wherein the mixing part and the closure part are configured to close the milk reservoir and to be removable with respect to the milk reservoir.

15. The milk frothing device according to claim 12, wherein the closure part includes a filling opening and a flap movable between an open position in which the flap at least partially releases the filling opening and enables an introduction of milk into the milk reservoir and a closed position in which the flap at least partially seals the filling opening.

16. An automatic coffee machine including a hot water/vapor outlet nozzle, a boiler producing hot water and/or vapor to feed said hot water/vapor outlet nozzle, and a milk frothing device according to claim 1, the hot water/vapor inlet orifice of the milk frothing device being connected to the hot water/vapor outlet nozzle.

* * * * *